United States Patent [19]
Damouth

[11] Patent Number: 4,833,492
[45] Date of Patent: May 23, 1989

[54] CHARGE NEUTRALIZATION FOR PLAIN PAPER ELECTROGRAPHY

[75] Inventor: David E. Damouth, Rochester, N.Y.

[73] Assignee: Xerox Corporation, Stamford, Conn.

[21] Appl. No.: 220,858

[22] Filed: Jul. 18, 1988

[51] Int. Cl.[4] .......... G01D 15/00
[52] U.S. Cl. .......... 346/159; 346/160.1
[58] Field of Search .......... 346/158, 159, 160.1; 355/3 DD, 3 CH, 14 D, 14 CH; 400/119; 358/300; 101/DIG. 13

[56] References Cited

U.S. PATENT DOCUMENTS

| | | | |
|---|---|---|---|
| 3,714,665 | 1/1973 | Mutschler et al. | 346/74 ES |
| 4,341,457 | 7/1982 | Nakahata et al. | 355/3 CH |
| 4,463,363 | 7/1984 | Gundlach et al. | 346/159 |
| 4,521,791 | 6/1985 | Day | 346/159 |
| 4,521,792 | 6/1985 | Clark et al. | 346/159 |
| 4,527,177 | 7/1985 | Day | 346/159 |
| 4,535,345 | 8/1985 | Wilcox et al. | 346/159 |
| 4,641,948 | 2/1987 | Nakahata et al. | 355/3 SH |
| 4,676,627 | 6/1987 | Ohno | 355/14 CH |
| 4,688,927 | 8/1987 | Oda et al. | 355/3 TR |

*Primary Examiner*—Arthur G. Evans
*Attorney, Agent, or Firm*—Ronald F. Chapuran

[57] ABSTRACT

An ion projection printing apparatus for printing on one side of a charge receptor sheet including an ion projection means, development means, a back electrode positioned on the opposite side of the sheet from the ion projection means, development means to receive the sheet in intimate contact, and a corotron disposed on the same side of the sheet as the ion projection means and the development means in the vicinity of the point of separation of the paper from the back electrode, the corotron providing a charge source to neutralize the residual electrical charge on said paper.

5 Claims, 2 Drawing Sheets

CHARGE NEUTRALIZATION FOR PLAIN PAPER ELECTROGRAPHY

BACKGROUND OF THE INVENTION

Figure 1:
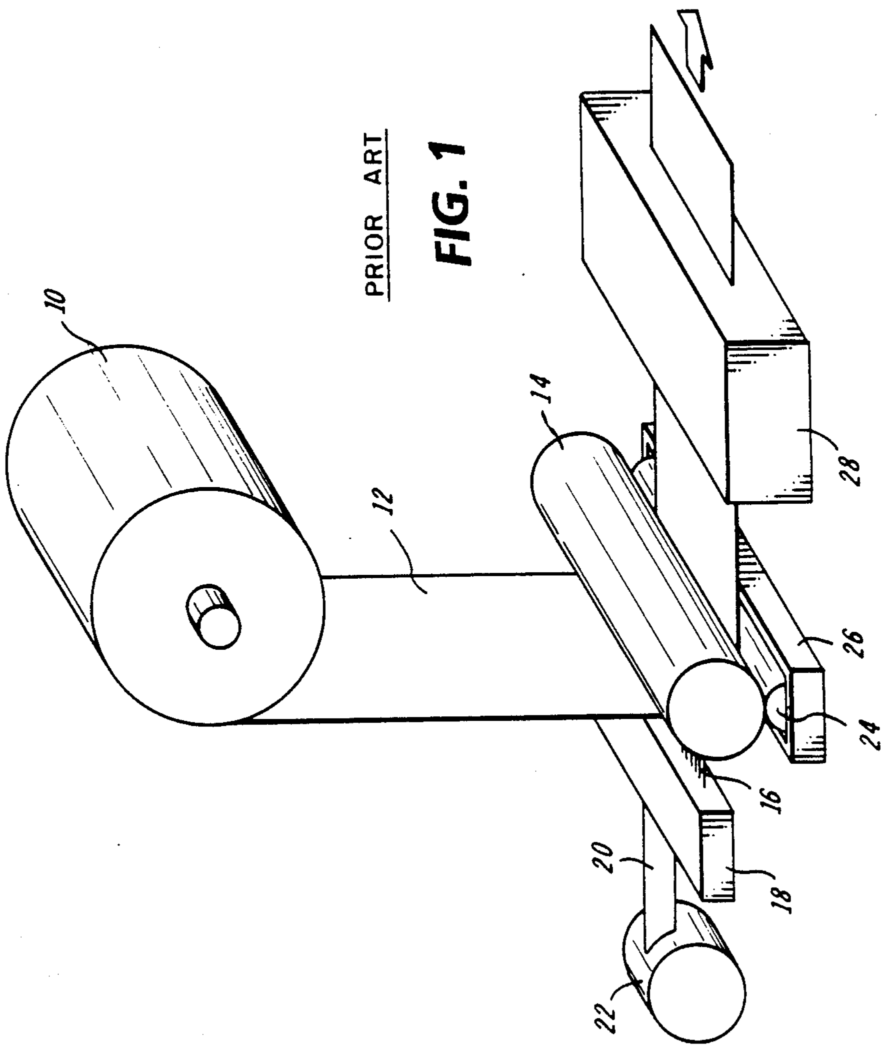
PRIOR ART FIG. 1

The invention relates to an ion projection printing apparatus and, in particular, to the charge neutralization of plain paper sheets after development in an ion projection printing apparatus.

PRIOR ART

In U.S. Pat. No. 4,463,363, assigned to the same assignee as the present application entitled "Fluid Jet Assisted Ion Projection System", there is described a high resolution, low cost, ion projection printing system. The application relates to a unique device for the generation of ions and their subsequent selective deposition, in an image configuration, onto a charge receptor. A jet of transport fluid traverses a channel passing through the ion generating device, sweeping the ions past a modulating device for delivering ion "beams" onto a charge receptor sheet, which may be ordinary paper. The paper sheet is held adjacent an electrically biased back electrode, which establishes a strong electric field for accelerating the ions toward the sheet and for providing a counter-charge for the ions supported on the exposed surface of the sheet. Downstream of the ion projection station, at a developing station, the image charge pattern may be rendered visible by toner particles which would be subsequently fixed to the receptor sheet at a fusing station.

In U.S. Pat. No. 3,714,665 entitled "Electrostatic Recording With Improved Electrostatic Charge Retention", there is taught a printing apparatus for recording upon ordinary paper. A charging station is provided for depositing an electrostatic charge pattern upon the paper. A conductive back electrode is positioned in contact with the opposite side of the paper and extends from the charging zone through a development zone, at which location the charge pattern is made visible.

It has been found that the backing electrode structures taught by Mutschler et al., if utilized with an ion projection image input device of the type taught by Gundlach et al. are each inadequate to achieve good image quality. As the paper with the toned image thereon separates from the back electrode, before the image is fused, toner image disruption is likely to occur. The disruption has been observed to take place when the distance between the paper and the back electrode increases to the extent that the Paschen breakdown voltage is exceeded, resulting in change transfer between the back electrode and the back surface of the paper.

In U.S. Pat. No. 4,535,345, (Wilcox et al.) assigned to the same assignee as this application, there is taught the use of a continuous back electrode for eliminating toner image disruption of the unfused toner particles on the receptor sheet.

In U.S. Pat. No. 4,521,791, (Day) assigned to the same assignee as this application, there is taught an improvement whereby the back electrode may be modified to introduce one or more thermal barrier gaps between the fuser and the image formation and development stations.

Other prior art systems include:

U.S. Pat. No. 4,688,927 to Oda et al. disclosing photocopying process which uses a charge eraser. The charge eraser, located at a separating station, neutralizes the electrostatic charge built on copying paper at a point where the copying paper separates from a photoreceptor carrier.

U.S. Pat. No. 4,641,948 to Nakahata et la. discloses a means to remove charge from a transfer medium containing an image. The charge is applied to the back side of the transfer medium after passing through a separating belt.

U.S. Pat. No. 4,676,627 to Ohno discloses an image forming apparatus. In particular, once an image bearing member is transferred to a transfer sheet, the sheet is subjected to a charge removing corona discharger. The corona discharger uses a detector to control the output of the charge being applied.

U.S. Pat. No. 4,521,792 to Clark et al. discloses an ion projection printer. A counter-charge is applied upon the rear surface of a sheet to prevent image charge disruption.

U.S. Pat. No. 4,341,457 to Nakahata et al. shows the use of a separating electrode or corona discharge to eliminate electrostatic forces. The charge is applied to the back side of a transfer medium.

In spite of previous attempts to solve the problem, however, ionographic imaging on dry ordinary paper continues to have difficulty in maintaining image quality in practical configurations. This is because as an electrostatic latent image and charged toner are applied to the paper, the necessary counter-charge resides in a back electrode rather than transferring into the (insulating) paper. When the paper is separated from the back electrode, as for example to pass through a fuser, electrostatic fields become high enough for air breakdown to occur and the toner image may be distrubed or blown off the paper. Attempted solutions such as having continuous back electrode from the imaging station through the fusing station have practical difficulties. Also, the creation of small gaps in the electrode to avoid thermal conduction problems lead to fairly complex machine geometry. It is an object of the present invention, therefore, to overcome the above mentioned difficulties and provide an new and improved charge neutralization technique.

SUMMARY OF THE INVENTION

This invention may be carried out by providing an ion printing system capable of placing electrostatic charges in image configuration upon a moving charge receptor, such as a length of ordinary paper. The system includes an ion projection device, a development device, and a fusing device. An electrically conductive back electrode, positioned adjacent the image receptor on the side opposite the ion projection device, serves to accelerate charge deposition upon the receptor and to provide a counter-charge to the latent image ion charge. A charging corotron is disposed on the same side of the paper as the ion projection device and development device in the vicinity of the point of separation of the paper from the back electrode to neutralize the charge on the paper.

Figure 2:
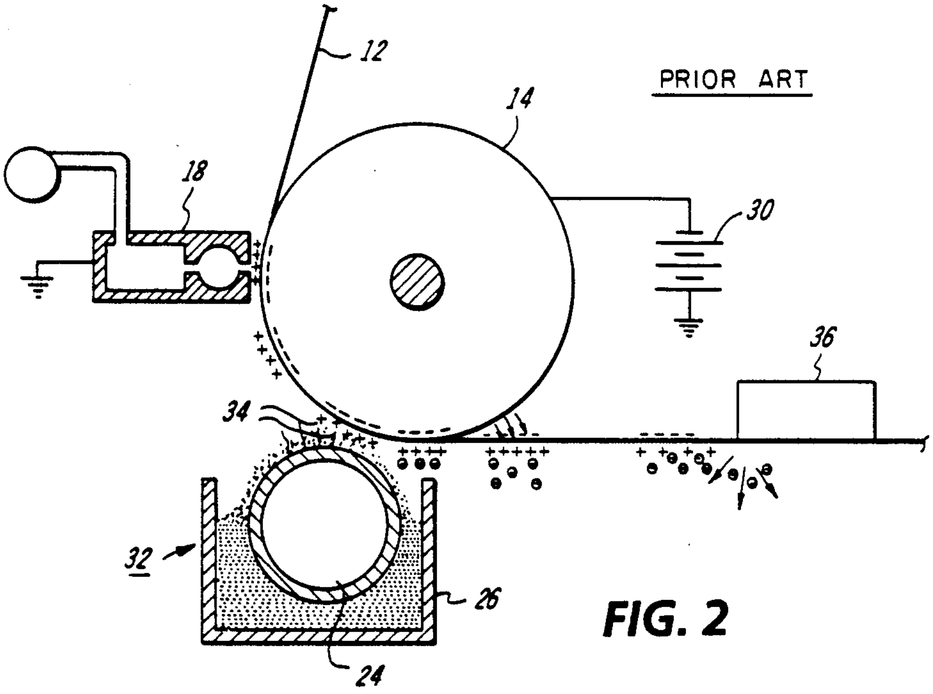
Figure 3:
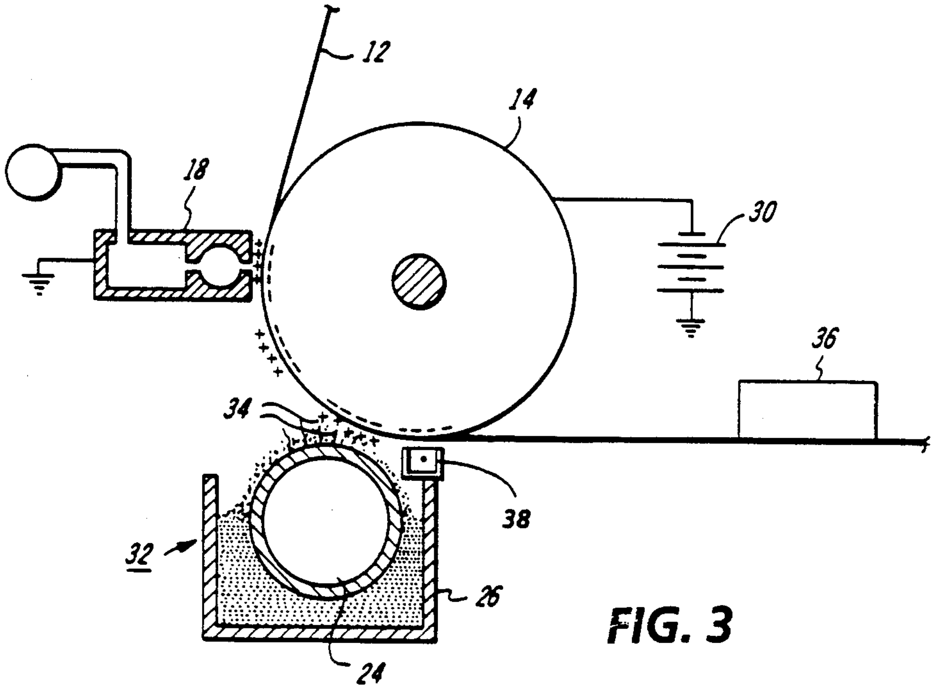

Other objects and further features and advantages of this invention will be apparent from the following description considered together with the accompanying drawings wherein:

FIG. 1 is a perspective view of an ion projection printing apparatus configured in accordance with the prior art teachings, FIG. 2 is a partial side elevation view of the FIG. 1 apparatus showing the areas of image disruption, and FIG. 3 is a side elevation view showing the charge neutralization device in accordance with the present invention.

With particular reference to the drawings there is illustrated in FIG. 1 a prior art ion projection printing system. A supply roll 10 of a suitable image receptor 12, preferably ordinary paper, delivers the receptor to an image receiving zone in intimate contact with the surface of a back electrode 14. The image is formed by the selective projection of ions 16 from the generation and projection head 18, the ions being transported through the head by a transport fluid, such as air, delivered by duct 20 from a suitable pump 22. An example of one form of the ion generation and projection head 18 is set forth in U.S. Pat. No. 4,463,363 (Gundlach et al.) incorporated herein.

The latent image is made visible by the application of toner particles to the charge bearing areas of the paper. A typical development apparatus comprises magnetic brush roller 24 rotatable through a sump 26 of magnetic toner particles where it picks up the toner and brushes it over the paper surface. Once the sheet has been developed it is transported past fuser 28 where the toner is caused to melt and to flow into the paper fibers forming an indelible print of the image.

In FIG. 2, there is illustrated in more detail the problem areas encountered in the printing system of FIG. 1. Positive ions exit the ion generation and projection head 18 and are deposited, in image configuration, on one side of the paper 12. The ions are accelerated to the paper by a field, established between the back electrode 14, connected to a high voltage bias source 30 (on the order of 1300 to 1400 volts DC), and the normally electrically grounded head. An image potential is created across the paper thickness by the induction of negative counter-charges, in the conductive back electrode behind the paper, to the positive image charges. Then the paper passes the development station 32 where the image is made visible by a single component magnetic dry toner. Development station 32 comprises a sump or trough 26, within which toner is stored for application by means of a magnetic brush roller 24. At the development zone, adjacent the paper 12, tendrils 34 of linked magnetic toner particles are formed, extending between the roller 24 and the sheet. As these tendrils of toner particles sweep over the surface of the paper a negative charge is induced on the particles and some are attracted to the positive surface charges of the established dipoles and adhere to the paper. Next, the paper is stripped form the back electrode and is drawn past the fuser 36 where the toner is heated to its melting point and flows into the paper fibers.

In order to achieve good image quality, it is necessary to maintain intimate contact between the back electrode 14 and the paper 12. However, as the sheet passes from the development station 32 to the fuser 36 it is normally stripped away from the back electrode 14. As the distance of separation increases, the electric field increases, causing the Paschen breakdown voltage to be reached and disruptive charge transfer to occur. During this phenomenon, the negative charges in the back electrode jump or spark across the gap to the rear surface of the paper. This is illustrated in FIG. 2 by the wavy arrows in the nip. In areas where there is a high charge density charge, i.e. large solidly toned areas, as opposed to line images, toner explosions have been observed leaving very low density spots in the image. Although the mechanism of toner exploding off of the paper is not fully understood, it is believed that the phenomenon is the result of mutual repulsion of some of the same polarity toner particles taking place subsequent to the uneven distribution of positive charges on the back surface of the paper, caused by the distribution of positive charges on the back surface of the paper, caused by the disruptive charge transfer.

If the paper has been separated from the back electrode before the image is fused, an additional area of toner disruption is exhibited as the paper arrives at the leading edge of the electrically conductive heated fuser. The toner particles again repel one another, and can be visually observed to explode in a semi-spherical manner, away from the paper surface. A definitive explanation for the disruption is not presently available, however, it is believed that it may be related to the uneven distribution of positive charges on the back surface of the paper, caused by the disruptive charge transfer as the paper is stripped from the back electrode.

When two electrostatic charge bearing surfaces are separated by a gas film, transfer of electrostatic images from one surface to the other requires movement of the electrical charges through the gas. The phenomenon of electrical breakdowon of an air gap (disruptive charge transfer) is explained by Paschen's law and may be graphically represented for air. It can be shown that as the gap between charge bearing surfaces gets smaller the breakdown voltage decreases and arrives at a minimum of about 360 volts at about 7.5 microns. Thereafter, as the gap gets smaller, the breakdown voltage increases because, it is believed, avalanching or sparking becomes less probable in the 2 to 4 micron range.

Typically, the ion generation and the projection head 18 of the type illustrated in FIG. 2 is capable of depositing ions having a charge density in the range of about 7 to 8 nanocoulombs/$cm^2$. A charge density of that magnitude would yield an electric field of about 8 to 9 volts/micron. At a separation of about 125 microns (i.e. about 5 mils) the electric field plot crosses the Paschen threshold plot and disruptive breakdown will occur.

In accordance with the present invention, it has been discovered that by suitable placement of a corotron on the image side of the paper, the fused toner image, overlying the charge image supported on the paper, will maintain its integrity. In particular, after imaging and development but before (or simultaneous with) separation of paper from backing electrode, the paper is neutralized from the front (i.e. image) side. This has the major advantage in that it is completely compatible with simple existing machine geometry. A small corotron is placed near the point where the paper separates from the back electrodes. Depending on the predictability of the charge on the toned paper, the corotron could be excited with DC, AC, or a combination thereof. As the paper separates from the back electrode, the potential rises and the spatial extent of the fields increases, allowing efficient collection of ions from the corona. Thus, a very modest corona current gives good neutralization.

In FIG. 3, there is illustrated the ion generation and projection head 18 to deposit ions on one side of the paper 12. The ions are accelerated to the paper by a field, established between the back electrode 14, connected to a high voltage bias source 30 and the normally electrically grounded head. An image potential is created across the paper thickness, to the positive image charges. Then the paper passes the development station 32 where the image is made visible by a single component magnetic dry toner. Next, the paper is stripped form the back electrode to be drawn past the platen fuser 36. However, after imaging and development but before (or simultaneous with) separation of paper from backing electrode, the paper is neutralized by the corotron 38 from the front (i.e. image) side. Any suitable corotron of di-corotron devices, excited with DC, AC, or a combination thereof, placed near the point where the paper separates from the back electrodes will generally suffice. As mentioned, as the paper separates from the back electrode, the potential rises and the spatial extent of the fields increases, allowing efficient collection of ions from the corona.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

I claim:

1. An ion projection printing apparatus for printing on one side of a sheet including sequentially in a processing direction, an ion projection means, development means, and fusing means comprising:

a back electrode positioned on the opposite side of the sheet from the ion projection means and development means to receive the sheet in intimate contact, the back electrode extending from the charging means to the development means, and a charging means disposed on the same side of the sheet as the ion projection means and the development means intermediate the development means and fusing means, in the vicinity of the point of separation of the sheet from the back electrode, the charging means providing a charge source to neutralize the residual electrical charge on said sheet.

2. The apparatus of claim 1 wherein the charging means is an a.c. or d.c. corotron.

3. The apparatus of claim 1 wherein the sheet is neutralized prior to separation from the back electrode.

4. An ion projection printing apparatus for printing on one side of a sheet including an ion projection means and development means comprising:

a back electrode positioned on the opposite side of the sheet from the ion projection means and development means to receive the charge receptor sheet in intimate contact, and a charging means disposed on the same side of the sheet as the ion projection means and the development means in the vicinity of the point of separation of the sheet from the back electrode, the charging means providing a charge source to neutralize the residual electrical charge on said sheet.

5. The apparatus of claim 4 wherein the charging means is a corotron.

* * * * *